(12) United States Patent
Lee et al.

(10) Patent No.: US 7,988,894 B2
(45) Date of Patent: *Aug. 2, 2011

(54) METHOD OF MAKING BIAXIALLY ORIENTED POLYOLEFIN FILM FOR COLD SEAL APPLICATIONS

(75) Inventors: Mark S. Lee, North Kingstown, RI (US); Keunsuk P. Chang, North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/250,434

(22) Filed: Oct. 13, 2008

(65) Prior Publication Data

US 2009/0045543 A1 Feb. 19, 2009

Related U.S. Application Data

(63) Continuation of application No. 10/678,652, filed on Oct. 6, 2003, now abandoned.

(60) Provisional application No. 60/415,757, filed on Oct. 4, 2002.

(51) Int. Cl.
*B29C 47/00* (2006.01)

(52) U.S. Cl. .......... 264/173.14; 264/173.16; 264/173.19

(58) Field of Classification Search ............. 264/173.14, 264/173.16, 173.19
See application file for complete search history.

(56) References Cited

U.S. PATENT DOCUMENTS

| | | | |
|---|---|---|---|
| 4,252,851 A | 2/1981 | Lansbury et al. | |
| 4,297,187 A | 10/1981 | DeGuchi et al. | |
| 4,956,232 A | 9/1990 | Balloni et al. | |
| 4,975,315 A | 12/1990 | Bothe et al. | |
| 5,292,563 A | 3/1994 | Peiffer et al. | |
| 5,298,302 A | 3/1994 | Boice | |
| 5,443,915 A | 8/1995 | Wilkie et al. | |
| 5,482,780 A | 1/1996 | Wilkie et al. | |
| 5,500,282 A | 3/1996 | Heffelfinger et al. | |
| 5,667,902 A | 9/1997 | Brew et al. | |
| 5,792,549 A | 8/1998 | Wilkie | |
| 5,900,294 A | 5/1999 | Murschall et al. | |
| 5,981,047 A | 11/1999 | Wilkie | |
| 5,985,426 A | 11/1999 | Wilkie | |
| 6,022,612 A | 2/2000 | Wilkie | |
| 6,106,659 A | 8/2000 | Spence et al. | |
| 6,165,599 A | 12/2000 | Demeuse | |
| 6,190,760 B1 * | 2/2001 | Nagai et al. | 428/213 |
| 6,214,447 B1 | 4/2001 | Nakagawa et al. | |
| 6,231,936 B1 | 5/2001 | Kozimor et al. | |
| 6,433,088 B1 * | 8/2002 | Saraf | 525/191 |
| 6,451,426 B2 | 9/2002 | Kong et al. | |
| 6,458,470 B1 | 10/2002 | DeLisio et al. | |
| 6,511,568 B1 | 1/2003 | Eckstein et al. | |
| 6,686,055 B2 | 2/2004 | Tanaka et al. | |
| 6,773,818 B2 | 8/2004 | Cretekos et al. | |
| 6,844,078 B2 | 1/2005 | Su et al. | |
| 6,887,582 B2 | 5/2005 | Lee et al. | |
| 6,916,526 B1 | 7/2005 | Chang et al. | |
| 6,924,041 B2 | 8/2005 | Lee et al. | |
| 2001/0012452 A1 | 8/2001 | Sasaki et al. | |
| 2002/0013415 A1 | 1/2002 | Mechelaere et al. | |
| 2002/0032295 A1 | 3/2002 | Peiffer et al. | |
| 2002/0064646 A1 * | 5/2002 | Cretekos et al. | 428/331 |
| 2002/0182426 A1 | 12/2002 | Tanaka et al. | |
| 2003/0072957 A1 * | 4/2003 | Lee et al. | 428/515 |
| 2005/0244661 A1 | 11/2005 | Lee et al. | |

FOREIGN PATENT DOCUMENTS

| | | |
|---|---|---|
| EP | 0186279 | 7/1986 |
| EP | 0444340 | 9/1991 |
| EP | 0909636 | 4/1999 |
| JP | 4-216829 | 8/1992 |
| WO | WO-98/10931 | 3/1998 |
| WO | WO 00/40406 | 7/2000 |
| WO | WO 0206043 | 1/2002 |
| WO | WO-03/066324 | 8/2003 |
| WO | WO-03/072353 | 9/2003 |

OTHER PUBLICATIONS

Lee et al., U.S. Office Action mailed Mar. 8, 2006, directed to U.S. Appl. No. 10/678,652; 6 pages.
Lee et al., U.S. Office Action mailed Jul. 31, 2006, directed to U.S. Appl. No. 10/678,652; 5 pages.
Lee et al., U.S. Office Action mailed Jan. 4, 2007, directed to U.S. Appl. No. 10/678,652; 12 pages.
Lee et al., U.S. Office Action mailed May 31, 2007, directed to U.S. Appl. No. 10/678,652; 13 pages.
Lee et al., U.S. Office Action mailed Nov. 15, 2007, directed to U.S. Appl. No. 10/678,652; 8 pages.
Lee et al., U.S. Office Action mailed Jun. 12, 2008, directed to U.S. Appl. No. 10/678,652; 8 pages.
Lee et al., U.S. Office Action mailed Oct. 16, 2003, directed to U.S. Appl. No. 10/270,237; 8 pages.
Lee et al., U.S. Office Action mailed Apr. 22, 2004, directed to U.S. Appl. No. 10/270,237; 8 pages.

(Continued)

*Primary Examiner* — Joseph S Del Sole
*Assistant Examiner* — James Sanders
(74) *Attorney, Agent, or Firm* — Morrison & Foerster LLP

(57) ABSTRACT

The present invention relates to methods of manufacturing multi-layered polyolefin films that provide excellent adhesion to cold seal cohesive formulations. A surface of the film is discharge-treated. It has been found that when the discharge-treated surface has at least 0.3% nitrogen functional groups, it provides an excellent cold seal receptive surface. A biaxially oriented polypropylene film made according the invention may also have a second skin layer, opposite the first layer, which may be used for metallizing, laminating, or printing.

15 Claims, No Drawings

OTHER PUBLICATIONS

Lee et al., U.S. Office Action mailed Sep. 9, 2004, directed to U.S. Appl. No. 10/758,528; 6 pages.

Lee et al., U.S. Office Action mailed Feb. 23, 2005, directed to U.S. Appl. No. 10/758,528; 6 pages.

Su et al., U.S. Office Action mailed Dec. 18, 2003, directed to U.S. Appl. No. 10/357,395; 6 pages.

Su et al., U.S. Office Action mailed May 18, 2004, directed to U.S. Appl. No. 10/357,395; 7 pages.

Lee et al., U.S. Appl. No. 60/328,410, filed Oct. 12, 2001.

International Search Report mailed Mar. 4, 2004, directed to International Application No. PCT/US2003/031732; 3 pages.

International Search Report mailed Jul. 2, 2003, directed to International Application No. PCT/US03/03442; 3 pages.

International Search Report mailed Feb. 28, 2003, directed to International Application No. PCT/US02/32629; 5 pages.

* cited by examiner

METHOD OF MAKING BIAXIALLY ORIENTED POLYOLEFIN FILM FOR COLD SEAL APPLICATIONS

CROSS-REFERENCE TO RELATED APPLICATIONS

This application is a continuation application of U.S. Ser. No. 10/678,652, filed Oct. 6, 2003, which claims the benefit of U.S. Provisional Application Ser. No. 60/415,157, filed Oct. 4, 2002, the entirety of which is incorporated herein by reference.

FIELD OF THE INVENTION

This invention relates to a polyolefinic multilayer film comprising a base layer of polypropylene, a first skin layer which is receptive to cold seal cohesive compositions, and an optional second skin layer, opposite the first skin layer. More specifically, the invention relates to a biaxially oriented polypropylene film providing a first skin layer comprising at least 0.3 atomic % nitrogen-functional groups on its surface which provides for an excellent cold seal receptive surface. An optional second skin layer, opposite the first skin layer, can be used for metallization, laminating, or printing.

BACKGROUND OF INVENTION

The term "cold seal" refers to sealing a package at ambient temperature, typically 15-26° C., using pressure only, as opposed to a high temperature sealant polymer that seals upon the onset of both heat and pressure. Because of their ability to form seals without heat, cold seal cohesives are ideally suited to the packaging of heat sensitive products such as bakery and confectionary products. In addition, cold seal cohesives allow faster packaging speeds to be achieved compared to typical heat-seal packaging methods.

Cold seal cohesives are a class of adhesives that bond primarily to themselves by the application of pressure only. These cohesives produce excellent face-to-face seals and adhere weakly or not at all with face-to-back contact. There are two essential components basic to commercial cold seal cohesives: a cohering component (natural or synthetic rubber) and a reinforcing polymer system that stabilizes and promotes substrate adhesion, and influences the aggressiveness of the cold seal. Natural rubber in latex form is an extremely high molecular weight, branched, and coiled polymer comprised largely of cis-polyisoprene. In a relaxed state, there are numerous molecular entanglements within the polymer chain and with adjoining polymer chains. When two surfaces of natural rubber are brought together, only a minimum of energy is required to induce an interdiffusion with entanglements of surface molecules. This affinity that natural rubber molecules have for themselves characterizes the cohesive bond. Modifying components are added to natural rubber to improve adhesion to the substrate.

The performance of the cold seal can vary based on many factors. Cold seals are perishable and should be used within the manufacturer's suggested shelf life or the performance of the cold seal could be adversely affected. In addition, cold seal cohesives can also stratify in storage and should be stirred prior to use or the cold seal performance could be adversely affected. Also, cold seal cohesives typically have a pH in the 10.0-10.3 range; however, materials that have had a lot of mixing or excessive press time may exhibit a drop in pH. Typically, if the pH drops below 8.5, the cold seal may not apply and perform correctly. High heat and humidity storage of the coated products could adversely affect the performance of the cold seal. Finally, improper drying of the cold seal coating could also negatively affect its sealing performance. As a result of the many variables that may affect the performance of a cold seal cohesive, it is difficult to compare cold seal data using: 1) Different cohesive lots; 2) Different time periods; 3) Different cohesive formulations; 4) Different application equipment; 5) Different coating weights. Therefore it is necessary to compare data tested at the same time, the same cold seal batch, the same application equipment, and the same coating weight. Thus, data gathered in this experiment cannot be directly compared to prior art data.

With most packaging applications, the cold seal is applied in a pattern around the perimeter of the lamination surface. These film laminations typically consist of: 1) An outer print and cold seal release film; 2) A film for direct application of the cold seal; and 3) An adhesive layer to bond these two films together. Typically, the film surface in which the cold seal cohesive is directly applied must have very good adhesion to the cold seal cohesive. If this adhesion of the cohesive to the film substrate does not exist, the consequence will be package failure at the location where the cohesive is in contact with the film substrate. This failure will result in loss of hermetic seal and ultimately spoilage of the food product contained within the package. Cold seal coating weights of 2 to 4.5 lb/ream satisfy most sealing requirements.

Thus, it is necessary to provide a film that has excellent adhesion to the cold seal cohesives. It is also necessary to provide a film that is compliant with US Food and Drug Administration regulations.

U.S. Pat. No. 4,297,187, the disclosure of which is incorporated herein by reference, discloses the use of a discharge treatment method on a plastic surface in a controlled atmosphere of $N_2$ and $CO_2$. This treatment method has been shown to provide a high surface energy to the substrate superior to discharge treatment methods conducted in air or in a purely nitrogenous atmosphere. Such a treated surface is particularly well-suited for metallizing or printing.

U.S. Provisional Patent Application 60/328,410, the disclosure of which is incorporated herein by reference, discloses an oriented, multi-layer film comprising a core layer, a first surface-treated skin layer consisting of a blend of ethylene/propylene copolymer and metallocene polyethylene, or a metallocene propylene homopolymer, or a butene propylene copolymer which provides excellent bond strengths to cold seal cohesives.

U.S. Pat. No. 4,252,851 discloses an oriented, multiple-layer film comprising a core layer and a skin layer comprising a propylene/butene copolymer having 10-15% butene content. The function of this layer is as a heat seal layer and there is no subsequent surface treatment performed on this heat seal layer.

U.S. Pat. No. 5,482,780 discloses a multilayer biaxially oriented polypropylene film having an isotactic polypropylene core, a cold seal release layer on one side of the core and a cold seal receptive layer on the opposite side of the core. The cold seal receptive layer consists of an ethylene-propylene random copolymer containing 2-8 wt % ethylene. This layer can either be flame or corona-treated to improve cold seal receptivity. This patent does not specify another treated layer for metallization on the opposite side of the core. In addition, this patent also uses a different cold seal adhesion formulation than the present invention.

U.S. Pat. No. 5,900,294 discloses a polyolefinic multilayer film comprising a base layer and at least one outer layer comprising a propylene/butene copolymer of 20-30 wt % butene. This patent does mention corona treating one side of the film but does not mention which side of the film is treated or the significance of the corona treatment. In addition, this patent does not mention the use of another treated layer used for metallization.

U.S. Pat. No. 6,022,612 discloses a multilayer biaxially oriented polypropylene film having an isotactic polypropylene polymer core and a cold seal receptive layer on the opposite side of the core. The cold seal receptive layer consists of 30-60% by weight of a thermoplastic rubber and between 40-70% by weight of a polyolefin polymer. The thermoplastic rubber is either a styrene-isoprene-styrene or styrene-butadiene-styrene copolymer. The polyolefin can be virtually any polyolefin from polypropylene, polyethylene, or copolymers thereof. This patent does not specify another treated layer for metallization on the opposite side of the core. In addition, this patent uses a different cold seal adhesion layer formulation than the present invention.

U.S. Pat. No. 6,165,599 discloses an oriented composite film comprised of a polypropylene core, having on one or both surfaces of the core skin layers comprised of a metallocene catalyzed polypropylene and a low molecular weight hydrocarbon resin. The purpose of this skin layer is to improve such properties as the film modulus, haze, and moisture barrier transmission. This patent does not teach the use of the metallocene polypropylene polymer for subsequent surface treatment and cold seal cohesive application.

International Application WO 00/40406 discloses a film structure comprising a first outer layer comprising a migratory additive, a second outer layer comprising a metallocene polyethylene and core layer in between the two outer layers. The metallocene polyethylene outer layer is laminated to a second film. This film does not disclose the subsequent treating or blending of the metallocene polyethylene skin layer. Therefore, the present invention is outside the scope of the above inventions.

SUMMARY OF THE INVENTION

The objective of this invention is to provide a film that provides an excellent bonding surface for cold seal cohesive formulations. This will result in a package which has improved hermetic seal performance. The present invention is a polyolefinic-based laminate film comprising:
(a) A polyolefin core layer; and
(b) One surface of said core layer treated by a surface treatment method comprising at least 0.3 atomic % nitrogen functional groups on said surface and providing an excellent bonding surface for cold seal cohesives. Optionally, a first skin layer may be coextruded on one side of the core layer, in which case the surface of said skin layer opposite the core layer comprises a polyolefin or polyolefin blends that are then treated by a surface treatment method comprising at least 0.3 atomic % nitrogen functional groups on said surface and providing an excellent bonding surface for cold seal cohesives;
(c) An optional second polyolefin skin opposite to said first polyolefin skin layer comprising a polyolefin or polyolefin blends that are treated by a surface treatment method suitable for metallizing, printing, or laminating.

The present invention provides a polyolefin film including a first cold seal adhesion layer and an optional second skin layer opposite the first cold seal adhesion layer for metallizing, laminating, printing, or coating. This film provides excellent adhesion to cold seal cohesive formulations. It has been found that excellent cold seal cohesive adhesion can be obtained without the need for esoteric or complex blends of polyolefin copolymers and polymers as shown in the prior art.

A cold seal compatible layer comprising of at least 0.3% atomic nitrogen functional groups provides superior cold seal cohesive adhesion without having to use blends of various polymers or copolymers and thus, an advantage of the present invention is that a simple, inexpensive propylene homopolymer can be used as a cold seal compatible layer with this type of surface modification.

DETAILED DESCRIPTION OF THE INVENTION

In one embodiment of the invention, the invention is a multi-layer polyolefin film that provides excellent adhesion characteristics to cold seal cohesive formulations. Specifically, the film is a 2-layer metallizable or printable biaxially oriented polypropylene film with the following structure:
(a) A core layer comprising a polypropylene resin, preferably of isotactic content of about 90% or greater with an amount of an antiblocking material incorporated into this layer of about 100-1000 ppm by weight of this layer, preferably 200-500 ppm. The antiblocking material used can be of many commercially available types such as silicas, silicates, crosslinked silicone polymers, polymethylmethacrylate spheres, etc. Preferred in this embodiment is a silica of nominal 6 um size such as W.R. Grace SYLOBLOC® 44. One side of this layer is further treated by a discharge surface treatment method to impart a high surface energy with at least 0.3 atomic % nitrogen functional groups, preferably 0.5-0.9%, for providing an excellent surface for cold seal adhesion. A preferred method for such discharge surface treatment is corona discharge in a controlled atmosphere mixture of $N_2$ and $CO_2$.
(b) A coextruded skin layer formed on the said core resin layer, opposite said treated surface. This coextruded skin layer can also be a polypropylene resin or copolymer of propylene resins. This skin layer is also treated by a discharge treatment method for utility as a metallizing or printing layer, though not necessary to be in a controlled atmosphere nor having to impart at least 0.3 atomic % nitrogen-bearing functional groups. Antiblocking agents can also be added to this coextruded skin layer such as already mentioned above, from 100-5000 ppm by weight of the skin layer. A preferred antiblock agent is a sodium calcium aluminum silicate of nominal 3 um size such as Misuzawa's SILTON® JC-30.

A second embodiment of the invention is a 3-layer polyolefin film that provides excellent adhesion characteristics to cold seal cohesive formulations. Specifically, the film is a metallizable or printable biaxially oriented film of the following structure:
(a) A core layer comprising a polypropylene polymer;
(b) A first skin layer comprising a propylene homopolymer of isotactic content 90% or greater and containing 100-5000 ppm by weight of this layer of an antiblocking agent as described previously in the first embodiment, preferably 4000-5000 ppm of nominal 3 um sodium calcium aluminum silicate such as SILTON® JC-30, formed on one side of said core layer. An optional amount of propylene-ethylene copolymer of 4% ethylene may also be included, up to 25% by weight of the skin layer. The side of this skin layer opposite the core layer is treated by a surface discharge treatment method in a controlled atmosphere of $N_2$ and $CO_2$ to impart at least 0.3 atomic % nitrogen-bearing functional groups for providing an excellent surface for cold seal adhesion; and, (c) A second skin layer formed on the core layer opposite the first skin layer, comprising of a propylene homopolymer of isotactic content of less than 89%, preferably 60-88% isotactic index, an antiblocking agent such as SILTON® JC-30 at a concentration of 100-5000 ppm by weight of the second skin layer, preferably 300-500 ppm. An optional amount of a petroleum resin or hydrocarbon resin can also be included, up to 15% by weight of the skin layer. The second skin layer is also treated by a surface discharge treatment method for utility as a metallizing or printing layer, though not necessary to be in a controlled atmosphere nor having to impart at least 0.3 atomic % nitrogen-bearing functional groups.

The polypropylene core resin layer is a crystalline polypropylene of a typically 90% isotactic content or greater. The first skin layer for cold seal adhesion is also a crystalline polypropylene of typically 90-93% isotactic content. Other skin layer formulations for cold seal adhesion can also be contemplated, namely blends of propylene homopolymer with ethylene-propylene copolymers or butene-propylene copolymers or any of the following and blends thereof: polypropylene (90-93% isotactic), low isotactic polypropylene (less than 90% isotactic), a matte layer of a block copolymer blend of polypropylene and one or more other polymers whose surface is roughened during the film formation step so as to produce a matte finish on the winding layer, metallocene catalyzed polyethylene, ethylene propylene random copolymer, metallocene catalyzed polypropylene, butene propylene copolymer. It is often desirable to add antiblock additives to this layer in concentrations of 0.01-0.5% by weight of the cold seal adhesion layer for machinability and winding. A key component of this invention, however, is that regardless of the actual polymer composition of this skin layer, the special discharge treatment in a controlled atmosphere of $N_2$ and $CO_2$ imparts at least 0.3 atomic % of nitrogen functional groups on the surface which significantly and surprisingly improves the cold seal cohesive adhesion to the polymer surface. The quantitative amount of nitrogen-bearing functional groups can be obtained by ESCA surface analysis. The nitrogen-bearing functional groups are of the types $(C,H)$—$N$, $(C,H)_4$—$N^+$, $C$—$(O,N)$, $NO_2^-$, and $NO_3^-$ and are generally found as a uniform modification of the film layer surface down to a depth of ca. 30-90 Å. In addition, oxygen-bearing functional groups are also formed of the types $C=O$, $O$—$C=O$, $C$—$OH$ along with the previously mentioned nitrogen functional groups.

Without being bound to any theory, it is speculated that the addition of the polar nitrogen functional groups to the surface along with the oxygen functional groups provide a more polar surface, higher surface energy, greater number of bonding sites, and thus, improved wettability for the cold seal cohesive rubber latex polymers to wet-out and adhere to compared to conventional discharge-treated surfaces such as flame or corona treatment in air, both of which only provide oxygen functional groups.

The multilayer film is typically 5 µm to 50 µm in thickness after biaxial orientation, preferably between 10 µm and 25 µm, and more preferably between 11 µm and 17.5 µm in thickness.

In the case of a 3-layer film, the cold seal cohesive compatible layer thickness is between 0.2 and 5 µm, preferably between 0.5 and 3 µm, and more preferably between 0.8 and 1 µm.

A third layer can be formed on the core layer opposite the cold seal cohesive adhesion layer. In this embodiment, this third layer is surface treated by a discharge treatment method and is used as a layer to enhance metallization, printing, or lamination. A preferred use is as a metal adhesion layer. This third layer may be composed of any of the following or blends thereof: polypropylene, low isotactic polypropylene, ethylene propylene random copolymer, butene propylene copolymer, and other polyolefins and additives that are suitable for metallizing. In addition, it is desirable to add antiblock additives to this layer in concentrations of 0.01-0.1% by weight of this third layer.

The thickness of this third layer is between 0.2-5 µm, preferably between 0.2-2 µm, and more preferably between 0.5-1 µm.

In the case where this invention is metallized, vapor-deposition of a metal is formed on the discharge-treated surface of the metal adhesion layer. The metallized film may include titanium, vanadium, chromium, manganese, iron, cobalt, nickel, copper, zinc, aluminum, gold, or palladium, the preferred being aluminum. The metal layer shall have a thickness between 5 and 100 nm, preferably between 30 and 70 nm; and an optical density between 2.0 and 5.0, preferably between 2.2 and 3.2.

The coextrusion process includes a two-layered or three-layered compositing die. The multi-layer laminate sheet is cast onto a cooling drum whose surface temperature is controlled between 20° C. and 60° C. to solidify the non-oriented laminate sheet.

The non-oriented laminate sheet is stretched in the longitudinal direction at about 135 to 165° C. at a stretching ratio of about 4 to about 5 times the original length and the resulting stretched sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat set to give a biaxially oriented sheet. The biaxially oriented film has a total thickness between 5 and 40 µm, preferably between 10 and 20 µm, and most preferably between 11 and 18 µm.

The surfaces of the polyolefin resin layer of the biaxially oriented laminate film is subjected to a discharge treatment as described previously. For the cold seal compatible surface, the preferred discharge treatment takes place in a controlled atmosphere of $CO_2$ and $N_2$ in order to impart a stable amount of nitrogen-bearing functional groups of at least 0.3% on the surface. To prepare the opposite surface for metallizing or other functions, it is preferred to subject that surface to a discharge treatment method as well, such as flame or corona treatment. The treated laminate sheet is then wound in a roll. The roll is placed in a metallizing chamber and the metal is vapor-deposited on the non-cold seal compatible discharge treated polyolefin resin layer surface. The metal film may include titanium, vanadium, chromium, manganese, iron, cobalt, nickel, copper, zinc, aluminum, gold, or palladium, the preferred being aluminum.

This invention will be better understood with reference to the following examples, which are intended to illustrate specific embodiments within the overall scope of the invention.

Example 1

One hundred parts by weight of a propylene homopolymer resin blended with 300 ppm of SYLOBLOC® 44 was coextruded with a skin layer of propylene homopolymer containing 5000 ppm of SILTON® JC-30 antiblock and biaxially oriented to produce a 2-layer film where the first propylene homopolymer resin layer was 11.5 µm thick and the accompanying coextruded skin layer of propylene homopolymer layer was 1 µm thick. The total oriented film thickness was 12.5 μm or 50 G or 0.5 mil thick. The film was then discharge-treated in a controlled atmosphere of $N_2$ and $CO_2$, on the propylene homopolymer skin layer side (the cold seal surface) and wound in roll form. The film's treated surface was tested for nitrogen and oxygen surface functional groups via ESCA. The film was then coated on said treated surface with ca. 2.9 lbs/ream of a variety of cold seal cohesives for evaluation: 2 types of natural latex cohesives (AtoFindley C1099 and Rohm & Haas 30061A) and 2 types of synthetic cold seal cohesives (AtoFindley C7200 and Rohm & Haas CF357B) and tested for cold seal adhesion bonds.

Comparative Example 1

A process similar to Example 1 was repeated except that the propylene homopolymer skin layer was discharge-treated in air and not in a controlled atmosphere of $N_2$ and $CO_2$.

Test Methods

The various properties in the above examples were measured by the following methods:
(a) Surface functional groups were measured by ESCA surface analysis using a Physical Electronics model 5700Lsci ESCA spectrometer. The X-ray source was monochromatic aluminum at a source power of 350 watts. The analysis region was 2 mm×0.8 mm and two exit angles (as defined as the angle between the surface plane and the electron analyzer lens) used: 20° and 80°. Chemical species are recorded in atomic %.
(b) Cold seal adhesion bonds were measured by taking cold seal cohesive, coated and dried to a coating weight of nominal 3.0 lbs/ream onto film specimens, and sealing them on a Sentinel model 12A heat sealer, using teflon-coated flat sealing jaws at room temperature, 40 psi, 0.5 second dwell. The sealed samples are then tested for seal strength on an Instron tensile tester, using a 90° T-peel angle while pulling. Bond strength is recorded in g/in.

The results of the foregoing example ("Ex. 1") and comparative example ("CEx. 1") are shown in Tables 1 and 2.

TABLE 1

Initial Cold Seal Bonds

|  | Atom % N | Atom % O | C1099* Natural latex Bond strength (g/in) | C7200* Synthetic Bond Strength (g/in) | 30061A^ Natural latex Bond Strength (g/in) | CF357B^ Synthetic Bond Strength (g/in) |
|---|---|---|---|---|---|---|
| Ex. 1 | 0.5 | 7.2 | 550 | 580 | 473 | 505 |
| CEx. 1 | 0.0 | 5.5 | 350 | 400 | 366 | 332 |

*Cold seal cohesive grades manufactured and sold by AtoFindley, Inc.
^Cold seal cohesive grades manufactured and sold by Rohm & Haas Co.

TABLE 2

Aged Cold Seal Bonds

|  | Atom % N | Atom % O | 1 week ambient aged | | 1 week heat aged (120° F.) | |
|---|---|---|---|---|---|---|
|  |  |  | 30061A^ (g/in) | CF357B^ (g/in) | 30061A^ (g/in) | CF357B^ (g/in) |
| Ex. 1 | 0.5 | 7.2 | 482 | 512 | 525 | 475 |
| CEx. 1 | 0.0 | 5.5 | 395 | 271 | 304 | 295 |

^Cold seal cohesives manufactured and sold by Rohm & Haas Co.

Tables 1 and 2 show that there is significant improvement of cold seal bond strengths when the cold seal receptive layer contains nitrogen functional group species. The improvement is seen not only after initial application of the cold seal cohesive but also after ambient aging and heat-aging to simulate longer storage times. This improvement is seen both with natural rubber latex cold seal cohesives as well as synthetic cold seals. This kind of improvement is especially notable since the cold seal receptive layer in the examples consist of propylene homopolymer, which to those skilled in the art, is often notoriously poor for cold seal compatibility even with conventional surface discharge treatment methods such as flame or corona treatment. Often, such propylene homopolymer surfaces are blended with a co- or terpolymer of some sort to improve its surface energy or ability to be treated more efficiently, and thus obtain consistent and strong cold seal bonds. Thus, the ability to provide superior cold seal adhesion by adding nitrogen functional groups to the surface without having to resort to polymer blending is a novel and cost-effective advantage.

We claim:

1. A method of manufacturing a polyolefin film comprising:
   providing a non-metallocene catalyzed polyolefin resin layer consisting of a propylene homopolymer;
   providing a metallizable surface on one side of the non-metallocene catalyzed polyolefin layer;
   discharge-treating a surface of the non-metallocene catalyzed polyolefin resin layer opposite the metallizable surface, wherein the discharge treated surface comprises at least 0.5 atomic % nitrogen functional groups; and
   applying a cold seal adhesive layer on the discharge-treated surface.

2. The method of claim 1, wherein the discharge-treating comprises a corona discharge treatment in a controlled atmosphere of nitrogen and carbon dioxide.

3. The method of claim 1, further comprising providing a second polyolefin layer, wherein the discharge treating is applied to a surface of the second polyolefin layer.

4. A method of making a polyolefin film comprising:
   coextruding a polyolefin core layer, a first coextruded skin layer of non-metallocene catalyzed polyolefin resin on one side of the polyolefin core layer, and a second coextruded skin layer of non-metallocene catalyzed polyolefin resin consisting of a propylene homopolymer on another side of the polyolefin core layer opposite the first coextruded skin layer;
   discharge treating the second coextruded skin layer; and
   applying a cold seal adhesive layer on the discharge-treated surface;
   wherein the first coextruded skin layer has a metallizable surface and the second coextruded skin layer comprising at least 0.5 atomic % nitrogen functional groups.

5. The method of claim 4, wherein the polyolefin core layer is a propylene homopolymer.

6. The method of claim 4, wherein the first coextruded skin layer has a thickness of about 0.5 to 5.0 μm.

7. The method of claim 4, wherein the first coextruded skin layer comprises an anti-blocking agent of about 0.01 to 0.5 percent by weight of the first coextruded skin layer.

8. The method of claim 4, wherein the first coextruded skin layer comprises a composition selected from the group consisting of polypropylene, low isotactic polypropylene, ethylene propylene random copolymer, butene propylene copolymer, ethylene-propylene-butene terpolymer and blends thereof.

9. The method of claim 4, wherein the first coextruded skin layer is treated to provide the metallizable surface.

10. The method of claim 4, wherein the second skin layer has a thickness of about 0.5-5.0 μm.

11. The method of claim 4, wherein the second skin layer comprises an anti-blocking agent of about 0.01 to 0.5 percent by weight of the second skin layer.

12. The method of claim 4, wherein the discharge-treating comprises corona discharging in a controlled atmosphere of nitrogen and carbon dioxide.

13. The method of claim 4, further comprising applying a metallized layer having an optical density of 2.0 to 5.0 to the first skin layer.

14. The method of claim 4, further comprising applying a metallized layer comprising aluminum to the first skin layer.

15. The method of claim 4, wherein the first skin layer is a polypropylene homopolymer.

\* \* \* \* \*